No. 823,514. PATENTED JUNE 19, 1906.
J. J. DANIEL.
APPARATUS FOR THE DISTRIBUTION OF WHEY OR SKIMMED MILK.
APPLICATION FILED APR. 2, 1906.
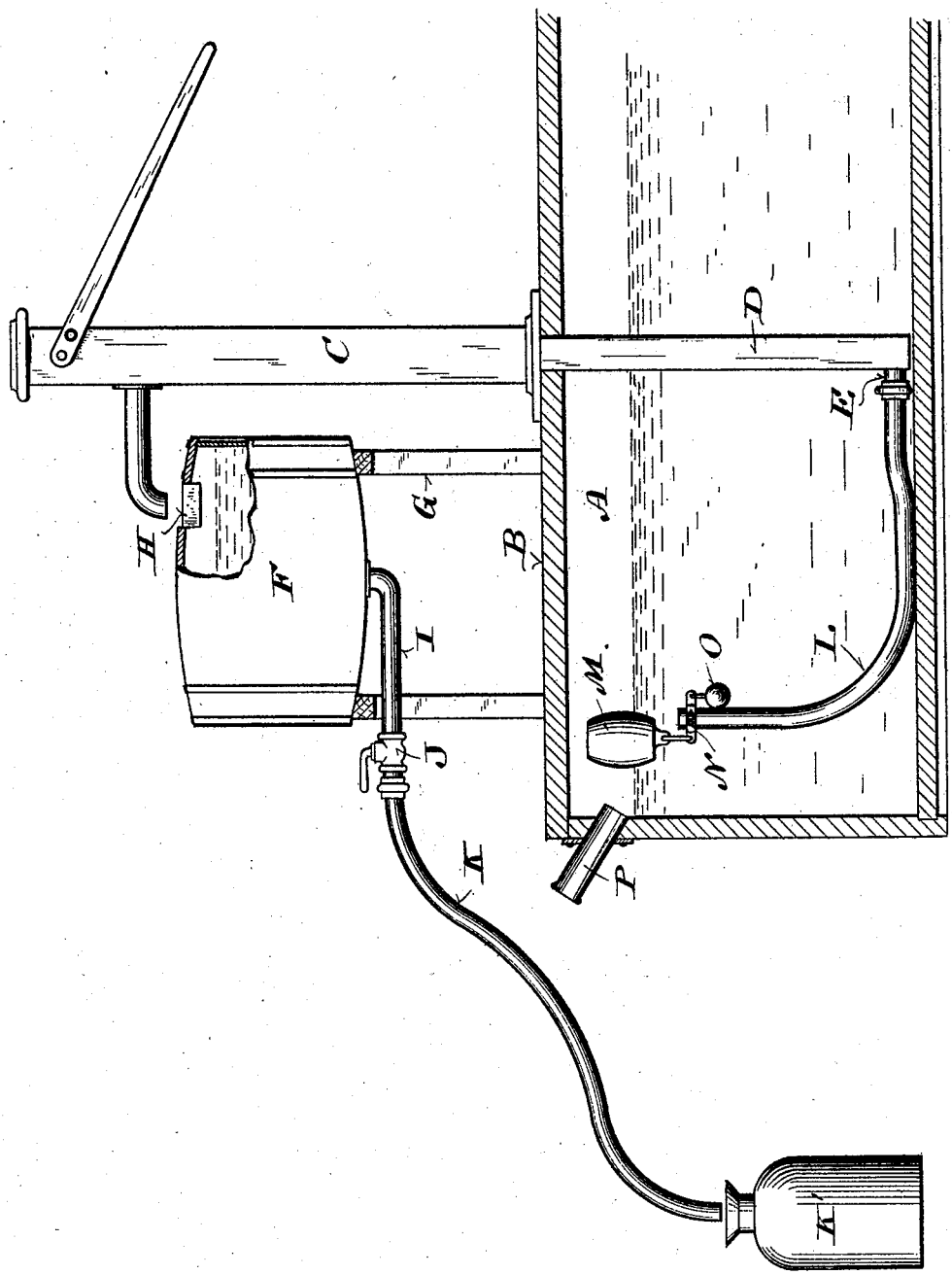

UNITED STATES PATENT OFFICE.

JOHN J. DANIEL, OF CAMBRIA, WISCONSIN.

APPARATUS FOR THE DISTRIBUTION OF WHEY OR SKIMMED MILK.

No. 823,514.        Specification of Letters Patent.        Patented June 19, 1906.

Application filed April 2, 1906. Serial No. 309,258.

*To all whom it may concern:*

Be it known that I, JOHN J. DANIEL, a citizen of the United States, and a resident of Cambria, in the county of Columbia and State of Wisconsin, have invented certain new and useful Improvements in Apparatus for the Distribution of Whey or Skimmed Milk; and I do hereby declare that the following is a full, clear, and exact description thereof.

The object of my invention is to provide a simple and effective apparatus for the distribution of whey or skimmed milk from creameries or cheese-factories to dairymen, the apparatus being so arranged as to deliver to each customer a uniform quality of whey or skimmed milk, as well as the exact quantity due.

Said invention consists in certain peculiarities of construction and combination of parts, as fully set forth hereinafter with reference to the accompanying drawing and subsequently claimed.

The drawing represents an elevation of a whey or skimmed-milk distributing apparatus made in accordance with my invention, with parts in section and parts broken away to better illustrate the structural features.

Referring by letter to the drawings, A indicates a waste-tank into which is emptied the whey or skimmed milk of a creamery or cheese-factory, the top of the tank being closed by a platform B, on which is mounted a pump C, having its barrel D extended downward into said tank with its suction-opening E adjacent to the bottom thereof. The pump-nozzle is arranged to discharge into a barrel or receiving-reservoir F, supported upon a suitable frame G, secured to the platform, said barrel being provided with an opening H to receive the liquid discharged from the pump and also a pipe connection I at its bottom, which connection is fitted with a stop-cock J and terminates with a coupling to which is adjusted a short section of hose K for the purpose of filling the receptacles of dairymen. The suction-opening of the pump-barrel has fitted thereto a hose-pipe L, the mouth or free end of which is secured to a float M by a clamp-ring N, said end being so adjusted with relation to the surface of the liquid as to draw of same at a depth which will give to each customer a uniform quality of whey or skimmed milk, it being understood that in tanks of the ordinary type the liquid is always drawn from the bottom, at which point said liquid is of the poorest grade, for the reason that the cream will rise to the surface, the consequence being the customers who are first supplied get a thin quality of milk or whey, while the last will draw off the rich upper surface as the tank is depleted of its contents. In order to hold the hose-mouth in its adjusted position, the clamping-ring N thereof is provided with a weight O, which prevents the hose, through its buoyancy, from rising at this point.

In operation the barrel or receiving-reservoir is normally filled with whey or milk, and to get a supply the agent opens the stop-cock J and places the hose K to his can or receptacle K' to fill the same. An operator then starts the pump, so that the reservoir-barrel is kept comparatively full by replacing the liquid drawn off, and when the proper quantity has been received by the customer the cock is closed. If it is desirous to empty the reservoir or barrel to prevent freezing of the contents, the hose K is inserted into a drain-pipe P and the stop-cock opened to permit the contents of said barrel to discharge back into the tank.

By the description it will be observed that a supply of liquid is always kept ready for delivery by gravity from the apparatus and that when the pump is operated the liquid is drawn from a point near the surface at all times whether the tank be filled or nearly exhausted of its contents. It is also understood from the foregoing description that while the agent attends to the delivery of the whey time is saved in the operation by the customer or employee operating together with said agent to do the manual work required.

I claim—

1. A whey or skimmed-milk delivery apparatus comprising a tank, a pump having its suction end adjacent to the bottom of the tank, a hose connected to the suction end of the pump, and a float in connection with the free end of the hose.

2. A whey or skimmed-milk delivery apparatus comprising a tank, a pump having its suction end adjacent to the bottom of the tank, a hose connected to the suction end of the pump, a float in connection with the free end of the hose, a receiving-reservoir at the discharge end of the pump, and a discharge-pipe having a stop-cock and hose-coupling in connection with the receiving-reservoir.

In testimony that I claim the foregoing I have hereunto set my hand, at Cambria, in the county of Columbia and State of Wisconsin, in the presence of two witnesses.

JOHN J. DANIEL.

Witnesses:
D. M. ROWLANDS,
MARY B. GLASS.